UNITED STATES PATENT OFFICE.

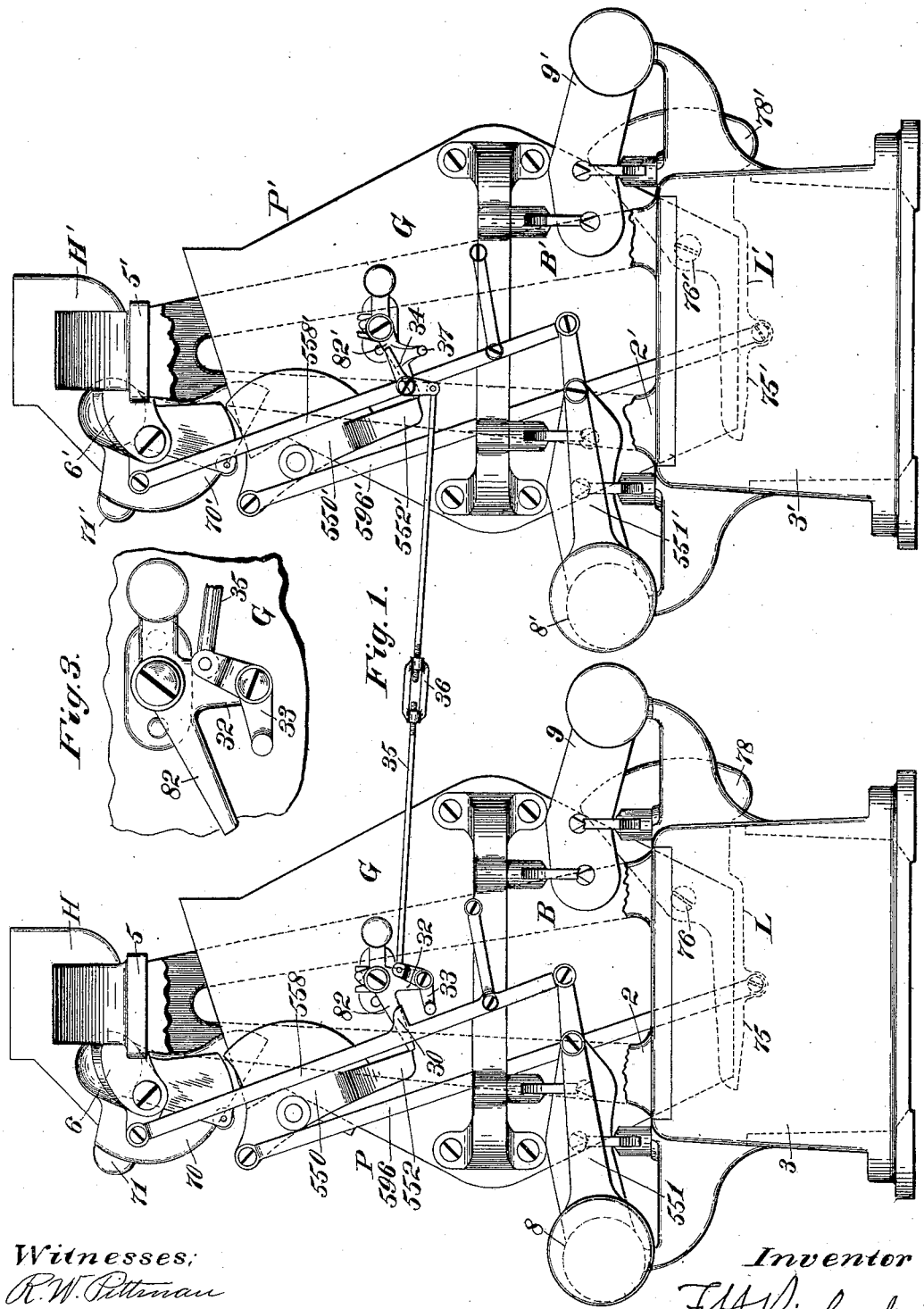

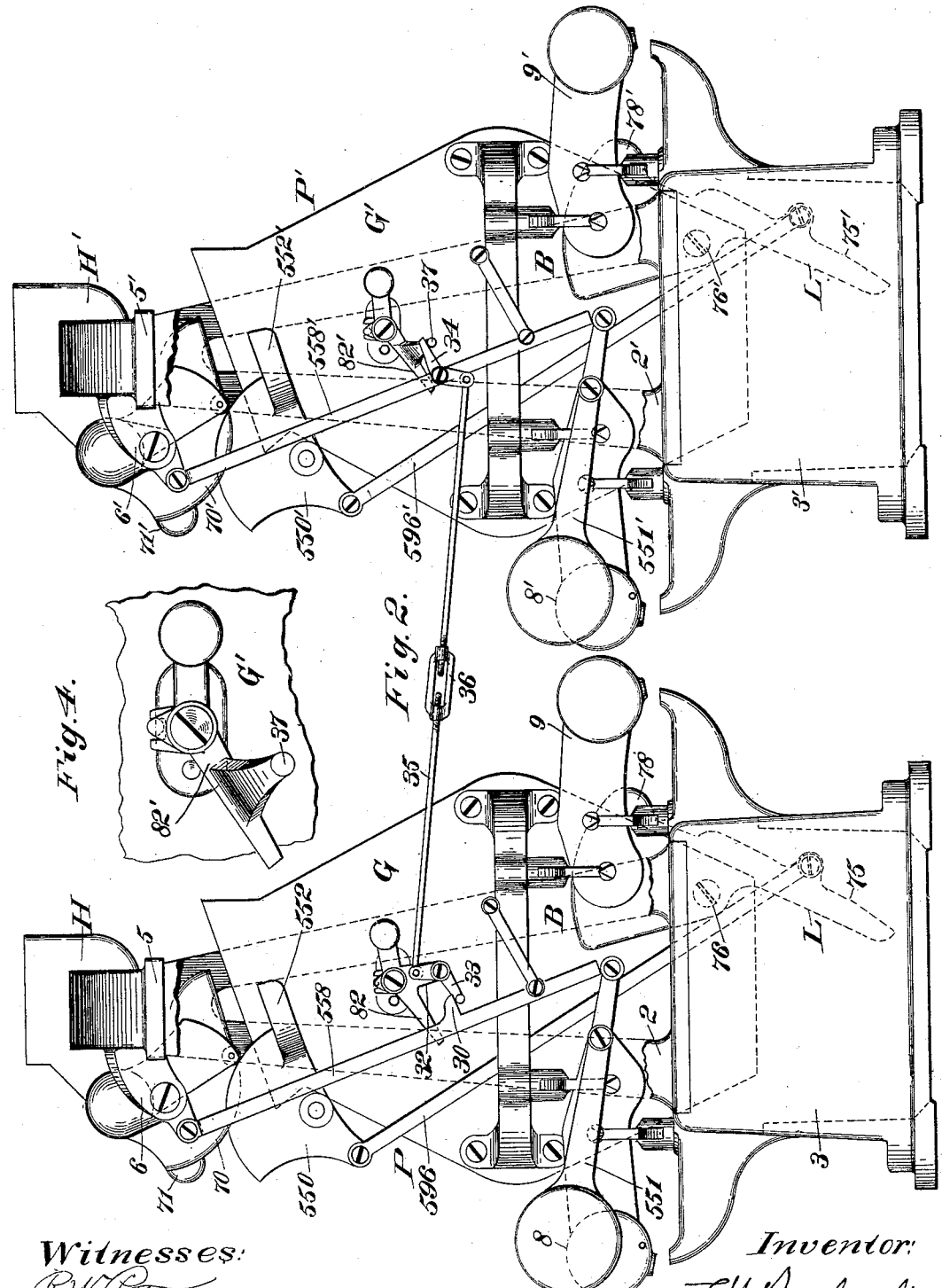

FRANCIS H. RICHARDS, OF HARTFORD, CONNECTICUT.

WEIGHING-MACHINE.

SPECIFICATION forming part of Letters Patent No. 565,229, dated August 4, 1896.

Application filed April 16, 1896. Serial No. 587,770. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing apparatus, the object of the invention being to provide an improved organization of this character embodying two weighing mechanisms, each having a bucket or load carrying receptacle, and operative connections between the two mechanisms for effecting a synchronous discharge of the bucket-loads thereof, whereby the apparatus is particularly adapted to the weighing and subsequent mixing of materials in a one-to-one ratio.

In the drawings accompanying and forming part of this specification, Figure 1 is a right-hand end elevation of a weighing apparatus comprehending my improvements in the preferred embodiment thereof and showing the positions assumed by the respective operative mechanisms at the commencement of operation. Fig. 2 is a similar view showing the positions occupied by said parts during the load-discharging period, and Figs. 3 and 4 are details hereinafter more particularly described.

Similar characters designate like parts in all the figures of the drawings.

My present invention, which is in the nature of an improvement upon the weighing apparatus shown, described, and claimed in Letters Patent No. 559,749, granted to me May 5, 1896, comprises, as one of its constituent elements, a pair of weighing mechanisms, which may be of any suitable character. For the purpose, however, of illustrating the nature of the invention it is herein shown in connection with weighing mechanism of the type disclosed in Letters Patent No. 548,840, granted to me October 29, 1895, to which reference may be had.

As a matter of convenience the two mechanisms will be designated by P and P', respectively, and, being the same in construction and mode of operation, except as hereinafter specified, it is deemed necessary to describe but one of said mechanisms in detail, for example, the mechanism P, the same reference-characters with prime-marks being employed to designate corresponding parts in the other mechanism.

My present invention embodies, fundamentally, two weighing mechanisms and synchronously-effective load-discharging means operatively connected with said mechanisms, so that a one-to-one ratio of load-discharge may be effected.

The framework for supporting the operative parts of the weighing mechanism will preferably consist of two side frames or members connected by a top plate or beam and mounted upon a chambered supporting-base into which the bucket-loads of material are intermittently discharged. One of these side frames is illustrated, it being designated by 2, the connecting top plate by 5, and the base by 3, the top plate 5 serving as a means for sustaining a chute or hopper H of ordinary construction.

The beam mechanism is designated in a general way by B, and is shown comprising the oppositely-disposed counterweighted scale-beams 8 and 9, respectively, which may be suitably mounted upon the base 3, and which may also carry suitable supports for the bucket mechanism.

The bucket mechanism is shown comprising two members, one of which is shiftable relatively to the other for discharging the bucket-load, and the bucket-closer, which is designated in a general way by L, is herein illustrated constituting such shiftable bucket-discharge member.

The bucket-closer is shown consisting of a suitably-formed plate or closer proper, 75, pivotally supported at 76 adjacent to one side of the discharge-outlet of the bucket G, and having the counterweighted arm or arms 78, preferably formed integral therewith, for returning the closer to its normal or shut position, as indicated in Fig. 1.

As a means for supporting the bucket-closer L an inverted toggle is illustrated, and it comprises the rocker 550, pivotally supported by the bucket G, and the relatively long connecting-rod 596, pivotally connected with the rocker and also with the closer in such a manner that when the closer is shut the two pivots of said connecting-rod or toggle member 596 will be nearly in line with and the upper of said pivots will be above the rocker-pivot, so that said rocker, when engaged by a latch or analogous device, may be held against oscillatory movement with a minimum pressure thereon, as practically the weight of the bucket contents will be supported from the pivot of the rocker.

As a means for holding the bucket-closer L against shifting or bucket-discharge movement a latch 82 is herein illustrated and will be preferably pivotally supported on the bucket G. The latch 82 in the embodiment herein illustrated swings upward to engage the rocker, and it may be provided with a detent for engaging a coöperating detent formed on the rocker-arm 552 when the parts are in the closed position previously described.

For effecting the release of the bucket-closer L the latch 82 is depressible or has a downward movement, so that its detent may be disengaged from the coöperating detent formed on the rocker-arm 552.

As a means for controlling the supply-stream which flows from the chute or hopper H the valve 70 is illustrated, which is substantially similar in construction and mode of operation to the improved valve disclosed in Letters Patent No. 535,727, granted to me March 12, 1895, to which reference may be had. The valve employed will be preferably pivotally supported for oscillatory movement beneath the mouth or discharge-outlet of the chute or hopper H, suitable brackets, preferably formed on the top plate 5, being employed for the purpose, (one of said brackets being shown at 6.) As a means for actuating the valve to close the same it is shown provided with a counterweight 71, suitably secured thereto at a point to the rear of its axis of movement.

For effecting the opening movement of the valve 70 the means disclosed in Letters Patent No. 548,839, granted to me October 29, 1895, may be employed, and, being illustrated, will now be described.

The valve 70 is shown provided with a relatively long thrust-rod 558, connected thereto at a point to the rear of its center of movement, the free end thereof being in position for receiving a thrust from a valve-opening actuator, which in the present instance is shown as the counterweighted lever 551, pivotally supported for shifting movement on the scale-beam 8.

The beam mechanism has the usual poising and counterpoising portions. All that part of said mechanism intermediate its supports constitutes the poising portion, and all that part thereof located outside of said supports constitutes the counterpoising portion.

The counterweighted lever 551 is shown pivoted on the counterpoising side of the scale-beam 8, its weight, however, being normally exerted on the counterpoising side of said scale-beam, as indicated in Fig. 1. At a predetermined point in the operation of the apparatus this lever is oscillated about its pivot, and the effective force of the weight thereof is transferred from the counterpoising to the poising side of the beam 8. (See Fig. 2.) On the return of said lever to its normal position an upward thrust will be imparted to the rod 558, with which it is in engagement, sufficient for opening the connected valve 70, to cause the flow of the supply-stream.

For effecting the simultaneous discharge of the bucket-loads of the two weighing mechanisms the means herein illustrated may be employed, and will now be described.

Each of the weighing mechanisms will be equipped with an actuator for releasing its bucket-discharge member, either of which is also operative for synchronously releasing the bucket-discharge member of the other mechanism, said members being, as will be understood, reciprocally effective. The reciprocating thrust-rod 558 of the weighing mechanism P is shown provided with a latch-tripper 30, which may be a projection or other suitable device carried by or formed thereon, and which has a descending movement into engagement with the closer-latch 82, or some part carried thereby, so that at a predetermined point in said movement said latch may be depressed or tripped for releasing the bucket-closer L, and simultaneously therewith releasing the bucket-closer L' of the mechanism P'. The latch 82 is shown provided with a downward projection or lug 32, on which is pivotally supported the angle-lever 33, the peculiar purpose of which will hereinafter be described. One of the arms or members of the angle-lever 33 (herein shown as its normally free arm) is shown disposed in the path of movement of the projection 30, and it will be evident that when said angle-lever is held against shifting movement on its supporting-latch 82 it becomes, in effect, a fixed projection, so that when engaged by the projection 30 on the descending movement of the latter, or when its normally free arm or member is thus engaged, the latch 82 will be positively depressed and the bucket-closer consequently released. For thus holding the angle-lever 33 against movement means operatively connected with the weighing mechanism P' will be preferably employed. The range of movement of the two latches 82 and 82' of the bucket-closers L and L', respectively, will preferably be limited, suitable stops or equivalent means being employed for this purpose.

The latch-tripping device for the weighing mechanism P' is herein shown as an angle-lever 34, pivotally supported at a proper point on the thrust-rod 558', and herein shown as operatively connected with the angle-lever 33, the connection between these two members being preferably an adjustable one, to thereby better adapt the apparatus to varying conditions. The connection herein shown for this purpose consists of the two-part connecting-rod 35, the adjacent ends of which are shown externally threaded.

The two parts of the rod 35 are connected by the turnbuckle 36, which may be of ordinary construction, the opposite ends being provided with screw-threaded seats or openings for the reception of the screw-threaded ends of the two-part rod 35, said ends and seats therefor being, respectively, right and left hand screw-threaded, as is usual. By rotating the turnbuckle in one direction or the other the connecting-rod 35 may be shortened or lengthened, as desired.

The two bucket-closers L and L' being closed, and maintained in such position through the medium of the two latches 82 and 82', respectively, which engage the rockers 550 and 550', and the valves 70 and 70' being open, the supply-streams will flow from the chutes H and H' into the empty buckets G and G'. As the buckets descend the beam mechanism which supports the same will descend in unison therewith, and the levers 551 and 551', moving with the beam mechanisms and falling from under the thrust-rods 558 and 558', which are connected with the two valves 70 and 70', permit the closing movement of the latter by the counterweights 71 and 71'. At the commencement of the poising period the two valves will be momentarily held against further movement by suitable means (not shown) as is customary to permit the flow of the reduced or drip streams into the buckets for the purpose of completing the partial loads therein. When the valves are thus held, the beam mechanisms, and the levers 551 and 551' supported thereby, will have a further descending movement away from the rods 558 and 558', the latter having been held against further descending movement on the interception of the two valves 70 and 70'. At this point in the operation of the apparatus the two latch-tripping devices 30 and 34 will be very near their respective latches 82 and 82'. Let it be assumed that the mechanism P has completed a bucket-load and that the valve 70 has been released. The rod 558 will have a further descending movement, and the projection 30 will be carried into contact with the angle-lever 33, and, oscillating the same about its pivot, will also oscillate the connected actuator or angle-lever 34, but which movement will be a very slight one. When the free arm of the angle-lever 34 has reached the latch or the pin 37 formed thereon, and the angle-lever 34 is held against oscillatory movement by its connection with the angle-lever 33, which is also held against movement by the projection 30, said angle-lever 34 becomes practically a fixed projection on the connecting-rod 558' and depresses the latch 82', and when this has released the rocker 550', and the latch has reached the limit of its descending or tripping movement, where it is intercepted by a suitable stop, said latch also holds the angle-lever 34, and hence the connected lever 33, against oscillating movement, so that when the free arm of the latter is engaged by the projection 30 the latch 82 may be depressed. Should the angle-lever 34 reach its latch-releasing position prior to the projection 30, it simply oscillates ineffectively about its pivot, due to the resistance interposed by the latch 82', or the pin 37 formed thereon, until said projection has reached its latch-releasing position, at which time the latter acts as a stop and prevents oscillation of the angle-lever 33 and the connected angle-lever 34, so that the latter, by engaging the pin 37, may depress the latch 82', and by the power of said angle-lever 34, exerted through the intervening connecting-rod 35, will simultaneously draw the latch 82 downward or depress the same. When the latches 82 and 82' have been thus depressed, the bucket-closers L and L' are thereby freed of all restraint, so that they may be forced open and the two bucket-loads simultaneously discharged.

Having described my invention, I claim—

1. The combination with a pair of weighing mechanisms, each embodying a shiftable bucket-discharge member, of means comprising a pair of latches normally operative for holding the bucket-discharge members against movement; tripping devices for each of said latches; and a direct connection between one of said latches and one of said devices.

2. The combination with a pair of weighing mechanisms, each embodying a shiftable bucket-discharge member, of means comprising a pair of latches normally operative for holding the bucket-discharge members against movement; tripping devices for each of said latches; and a direct adjustable connection between one of said latches and one of said devices.

3. The combination with a pair of weighing mechanisms, each embodying a shiftable bucket-discharge member, of means comprising a pair of latches for normally holding the same against movement; an angle-lever for tripping the latch of one of said mechanisms; and a direct connection between said angle-lever and the latch of the other mechanism.

4. The combination with two weighing mechanisms, each embodying a shiftable bucket-discharge member, and a latch for holding the same against movement; of an angle-lever supported by one of said latches; an angle-lever for tripping the other latch; a connection between said angle-levers; and a stop for said first-mentioned lever.

5. The combination with two weighing mechanisms, each embodying a shiftable bucket-discharge member, and a latch for holding the same against movement; of an angle-lever supported by one of said latches; an angle-lever for tripping the other latch; a connection between said angle-levers; and a thrust-rod provided with a projection for engaging said first-mentioned angle-lever.

6. The combination with two weighing mechanisms, each having a latch, and each having a latch-tripping device normally free of the latch; and a latch-operating connector carried on one of said latches in position for operating the other of said latches; and a power connection between the latch-operating connector of one weighing mechanism and the said device of the other weighing mechanism, whereby the resistance to the operation of one of said connector devices operates through the power connection for actuating the other said device; the construction and organization being such that the weighing mechanism first completing its operation will start the latch-operating devices for discharging both loads at the completion of the weighing operation of the second mechanism.

FRANCIS H. RICHARDS.

Witnesses:
    FRED. J. DOLE,
    R. E. BURKE.